United States Patent
Guim Bernat et al.

(10) Patent No.: US 12,289,362 B2
(45) Date of Patent: Apr. 29, 2025

(54) MULTI-TENANT ISOLATED DATA REGIONS FOR COLLABORATIVE PLATFORM ARCHITECTURES

(71) Applicant: Intel Corporation, Santa Clara, CA (US)

(72) Inventors: Francesc Guim Bernat, Barcelona (ES); Karthik Kumar, Chandler, AZ (US); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 977 days.

(21) Appl. No.: 17/134,374

(22) Filed: Dec. 26, 2020

(65) Prior Publication Data

US 2021/0120077 A1    Apr. 22, 2021

(51) Int. Cl.
*H04L 67/1001* (2022.01)
*H04L 9/08* (2006.01)

(52) U.S. Cl.
CPC ........ *H04L 67/1001* (2022.05); *H04L 9/0819* (2013.01); *H04L 9/085* (2013.01); *H04L 9/0861* (2013.01)

(58) Field of Classification Search
CPC ... H04L 67/1001; H04L 9/0819; H04L 9/085; H04L 9/0861; H04L 63/0435; H04L 63/062; H04L 63/104; H04L 67/1023; H04L 67/1097; H04L 9/14
See application file for complete search history.

(56) References Cited

U.S. PATENT DOCUMENTS

| | | | |
|---|---|---|---|
| 7,089,561 B2 | 8/2006 | Morrison et al. | |
| 8,706,772 B2 | 4/2014 | Hartig et al. | |
| 9,667,416 B1* | 5/2017 | Machani | H04L 9/3215 |
| 10,460,270 B2 | 10/2019 | Jain et al. | |
| 11,133,933 B1* | 9/2021 | Grund | G06F 16/2471 |
| 11,272,036 B2* | 3/2022 | Li | H04M 7/0012 |
| 11,579,783 B1* | 2/2023 | David | H04L 9/14 |
| 11,669,321 B2* | 6/2023 | Srinivasan | G06F 16/212 717/169 |
| 2012/0166818 A1* | 6/2012 | Orsini | H04L 9/3247 713/193 |
| 2018/0314723 A1* | 11/2018 | Frantz, III | G06F 16/256 |
| 2019/0087354 A1* | 3/2019 | Chhabra | G06F 21/602 |

(Continued)

FOREIGN PATENT DOCUMENTS

WO    2020226979 A2    11/2020

OTHER PUBLICATIONS

International Search Report and Written Opinion for PCT Patent Application No. PCT/US21/51490, Mailed Jan. 3, 2022, 11 pages.

*Primary Examiner* — Benjamin M Thieu
(74) *Attorney, Agent, or Firm* — Essential Patents Group, LLP; Christopher K. Gagne

(57) ABSTRACT

A multi-tenant dynamic secure data region in which encryption keys can be shared by services running in nodes reduces the need for decrypting data as encrypted data is transferred between nodes in the data center. Instead of using a key per process/service, that is created by a memory controller when the service is instantiated (for example, MKTME), a software stack can specify that a set of processes or compute entities (for example, bit-streams) share a private key that is created and provided by the data center.

22 Claims, 16 Drawing Sheets

(56) References Cited

U.S. PATENT DOCUMENTS

| | | | |
|---|---|---|---|
| 2020/0127980 A1* | 4/2020 | Smith | H04L 41/5025 |
| 2020/0134207 A1 | 4/2020 | Doshi et al. | |
| 2020/0159676 A1* | 5/2020 | Durham | G06F 12/0811 |
| 2020/0201789 A1* | 6/2020 | Durham | H04L 9/0894 |
| 2020/0242258 A1* | 7/2020 | Smith | H04L 9/3268 |
| 2021/0120077 A1 | 4/2021 | Bernat et al. | |

* cited by examiner

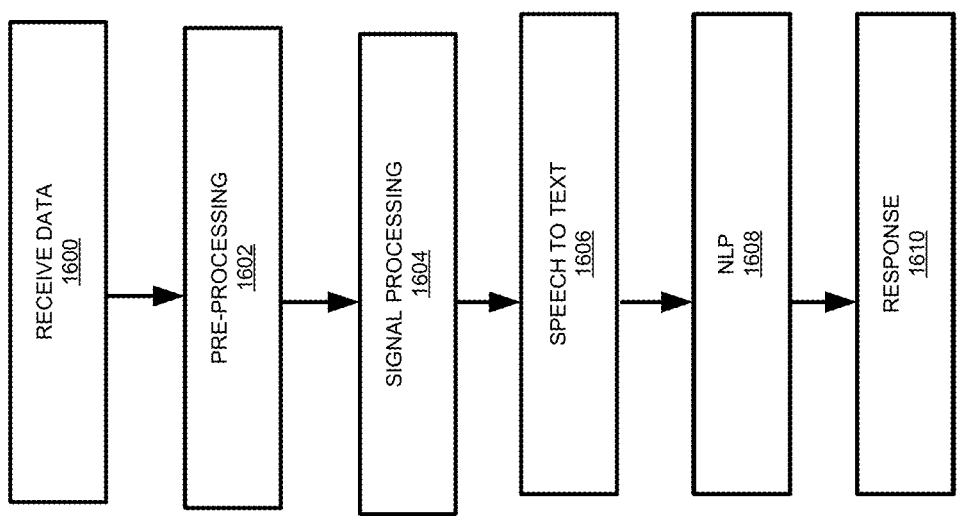

MULTI-TENANT ISOLATED DATA REGIONS FOR COLLABORATIVE PLATFORM ARCHITECTURES

BACKGROUND

Cloud computing provides access to servers, storage, databases, and a broad set of application services over the Internet. A cloud service provider offers cloud services such as network services and business applications that are hosted in servers in one or more data centers that can be accessed by companies or individuals over the Internet. Hyperscale cloud-service providers typically have hundreds of thousands of servers. Each server in a hyperscale cloud includes storage devices to store user data, for example, user data for business intelligence, data mining, analytics, social media and microservices. The cloud service provider generates revenue from companies and individuals (also referred to as tenants) that use the cloud services.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 16 is a flowgraph illustrating the use of the secure data region in the system shown in FIG. 12 to process a received request by a set of different services owned by different tenants.

Figure 1:
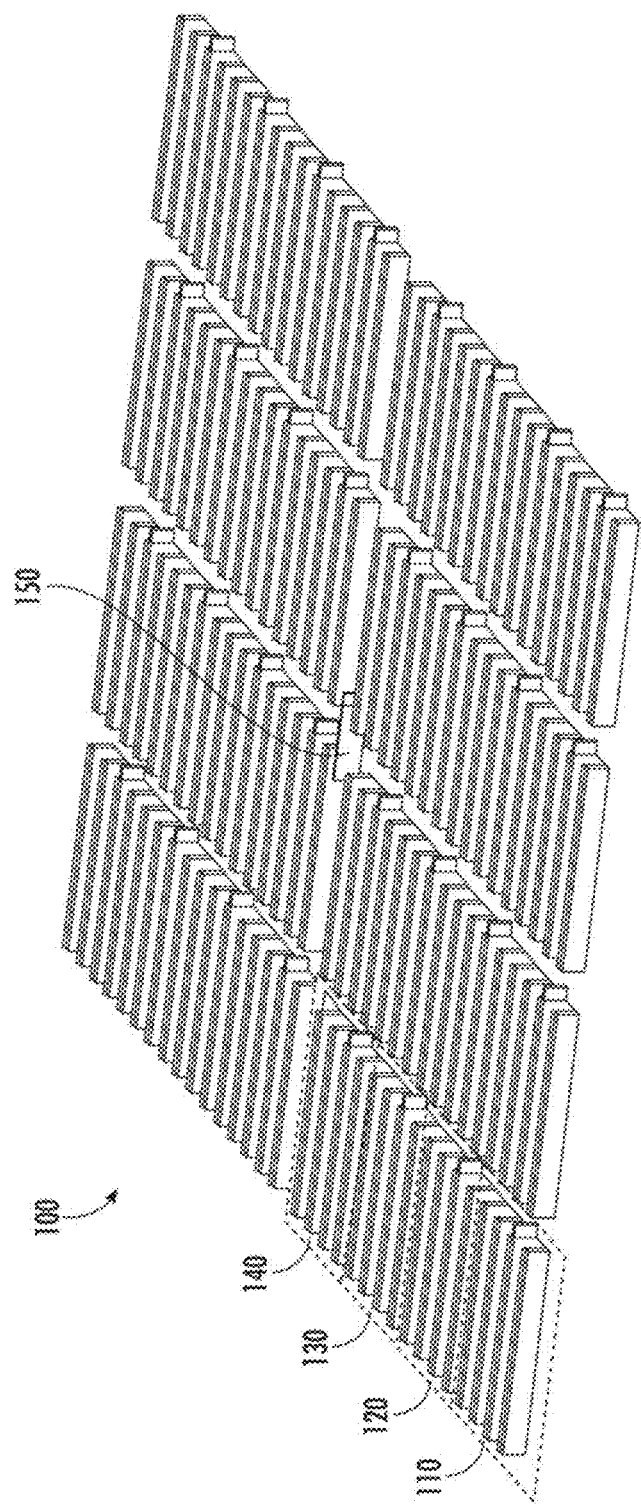
FIG. 1 is a simplified diagram of at least one embodiment of a data center for executing workloads with disaggregated resources.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

Memory is frequently shared by locally attached accelerator devices and general purpose processors in a data center. As there is only "one" copy of the data, data is not transferred from one stage to the other in the referenced compute pipeline.

However, especially with the advent of CXL, an open, standard interconnect based on the PCI Express (PCIe) 5.0 physical layer infrastructure that provides high-performance connectivity between one or more host processors and other devices, there are increasing number of scenarios when devices attached via CXL do not share memory with the other compute entities. For example, a CXL-attached GPU (compute node 500) or a CXL-attached FPGA (compute node 500), or a memory pool (for example, the memory sets 830, 832) attached via CXL may not share memory. In all of these cases, due to memory not being shared, data has to be transferred between the nodes (for example, memory pool and compute nodes (GPU, FPGA)) multiple times. In an example when Multi-Key Total Memory Encryption (MKTME) is used, the data center unnecessarily spends power in decrypting data received from one node, securely transferring over the PCIe bus, and encrypting in the next node.

In an embodiment, a multi-tenant dynamic secure data region in which encryption keys can be shared by services running in nodes reduces the need for decrypting data as encrypted data is transferred between nodes in the data center. Instead of using a key per process/service that is created by a memory controller when the service is instantiated (for example, MKTME), a software stack can specify that a set of processes or compute entities (for example, bit-streams) share a private key that is created and provided by the data center.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 depicts a data center in which disaggregated resources may cooperatively execute one or more workloads (e.g., applications on behalf of customers) that includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple nodes, some of which may be equipped with one or more type of resources (e.g., memory devices, data storage devices, accelerator devices, general purpose processors). Resources can be logically coupled to form a composed node or composite node, which can act as, for example, a server to perform a job, workload or microservices. In the illustrative embodiment, the nodes in each pod 110, 120, 130, 140 are connected to multiple pod switches (e.g., switches that route data communications to and from nodes within the pod). The pod switches, in turn, connect with spine switches 150 that switch communications among pods (e.g., the pods 110, 120, 130, 140) in the data center 100. In some embodiments, the nodes may be connected with a fabric using Intel® Omni-Path technology. In other embodiments, the nodes may be connected with other fabrics, such as InfiniBand or Ethernet or PCI Express or direct optical interconnect. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different pods 110, 120, 130, 140. As such, some resources of a single node may be allocated to one managed node while other resources of the same node are allocated to a different managed node (e.g., one processor assigned to one managed node and another processor of the same node assigned to a different managed node).

A data center comprising disaggregated resources, such as data center 100, can be used in a wide variety of contexts, such as enterprise, government, cloud service provider, and communications service provider (e.g., Telcos), as well in a wide variety of sizes, from cloud service provider mega-data centers that consume over 60,000 sq. ft. to single- or multi-rack installations for use in base stations.

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because nodes predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
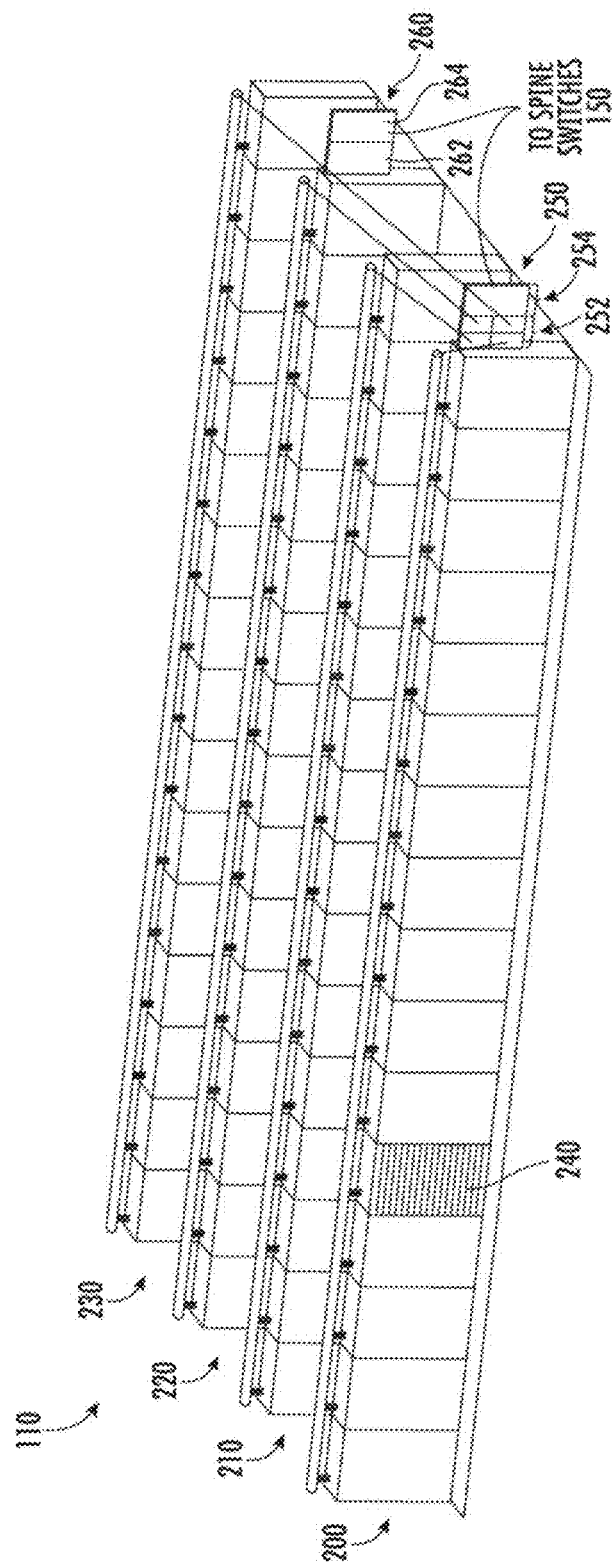
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple nodes (e.g., sixteen nodes) and provide power and data connections to the housed nodes, as described in more detail herein. In the illustrative embodiment, the racks in each row 200, 210, 220, 230 are connected to multiple pod switches 250, 260. The pod switch 250 includes a set of ports 252 to which the nodes of the racks of the pod 110 are connected and another set of ports 254 that connect the pod 110 to the spine switches 150 to provide connectivity to other pods in the data center 100. Similarly, the pod switch 260 includes a set of ports 262 to which the nodes of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the nodes in the pod 110 may still maintain data communication with the remainder of the data center 100 (e.g., nodes of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple nodes as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
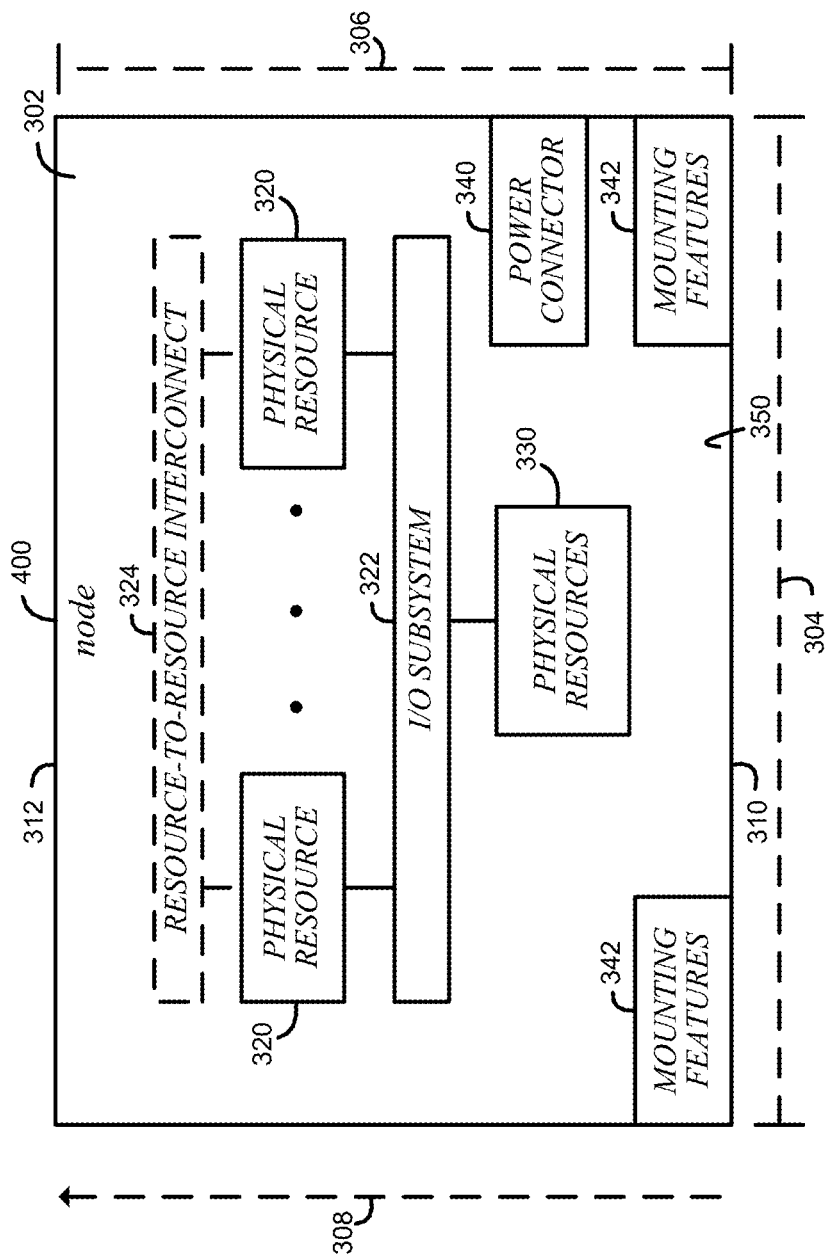
FIG. 3 is a simplified block diagram of at least one embodiment of a top side of a node.

Referring now to FIG. 3, node 400, in the illustrative embodiment, is configured to be mounted in a corresponding rack 240 of the data center 100 as discussed above. In some embodiments, each node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8. Each rack 240 may contain one or more nodes of a single or multiple node types—compute, storage, accelerator, memory, or others.

As discussed above, the illustrative node 400 includes a circuit board substrate 302, which supports various physical resources (e.g., electrical components) mounted thereon.

As discussed above, the illustrative node 400 includes one or more physical resources 320 mounted to a top side 350 of the circuit board substrate 302. Although two physical resources 320 are shown in FIG. 3, it should be appreciated that the node 400 may include one, two, or more physical resources 320 in other embodiments. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in embodiments in which the node 400 is embodied as a compute node, as accelerator co-processors or circuits in embodiments in which the node 400 is embodied as an accelerator node, storage controllers in embodiments in which the node 400 is embodied as a storage node, or a set of memory devices in embodiments in which the node 400 is embodied as a memory node.

The node 400 also includes one or more additional physical resources 330 mounted to the top side 350 of the circuit board substrate 302. In the illustrative embodiment, the additional physical resources include a network interface controller (NIC) as discussed in more detail below. Of course, depending on the type and functionality of the node 400, the physical resources 330 may include additional or other electrical components, circuits, and/or devices in other embodiments.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations.

In some embodiments, the node 400 may also include a resource-to-resource interconnect 324. The resource-to-resource interconnect 324 may be embodied as any type of communication interconnect capable of facilitating resource-to-resource communications. In the illustrative embodiment, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), or other high-speed point-to-point interconnect dedicated to resource-to-resource communications.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. That is, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some embodiments, voltage regulators are placed on a bottom side 450 (see FIG. 4) of the circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

In some embodiments, the node 400 may also include mounting features 342 configured to mate with a mounting arm, or other structure, of a robot to facilitate the placement of the node 300 in a rack 240 by the robot. The mounting features 342 may be embodied as any type of physical structures that allow the robot to grasp the node 400 without damaging the circuit board substrate 302 or the electrical components mounted thereto. For example, in some embodiments, the mounting features 342 may be embodied as non-conductive pads attached to the circuit board substrate 302. In other embodiments, the mounting features may be embodied as brackets, braces, or other similar structures attached to the circuit board substrate 302. The particular number, shape, size, and/or make-up of the mounting feature 342 may depend on the design of the robot configured to manage the node 400.

Figure 4:
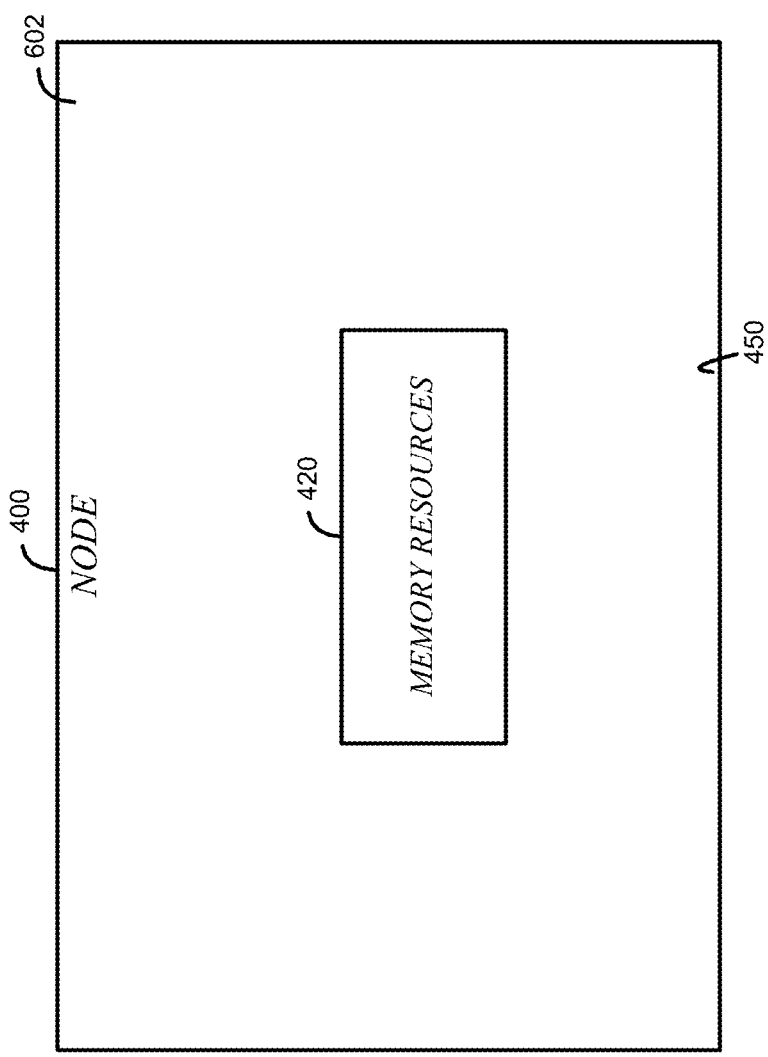
FIG. 4 is a simplified block diagram of at least one embodiment of a bottom side of a node.

Referring now to FIG. 4, in addition to the physical resources 330 mounted on the top side 350 of the circuit board substrate 302, the node 400 also includes one or more memory devices 420 mounted to a bottom side 450 of the circuit board substrate 302. That is, the circuit board substrate 302 can be embodied as a double-sided circuit board. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some embodiments. Alternatively, in other embodiments, each physical resource 320 may be communicatively coupled to each memory device 420.

The memory devices 420 may be embodied as any type of memory device capable of storing data for the physical resources 320 during operation of the node 400, such as any type of volatile (e.g., dynamic random access memory (DRAM), etc.) or nonvolatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices, for example, memory devices that use chalcogenide glass, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 5:
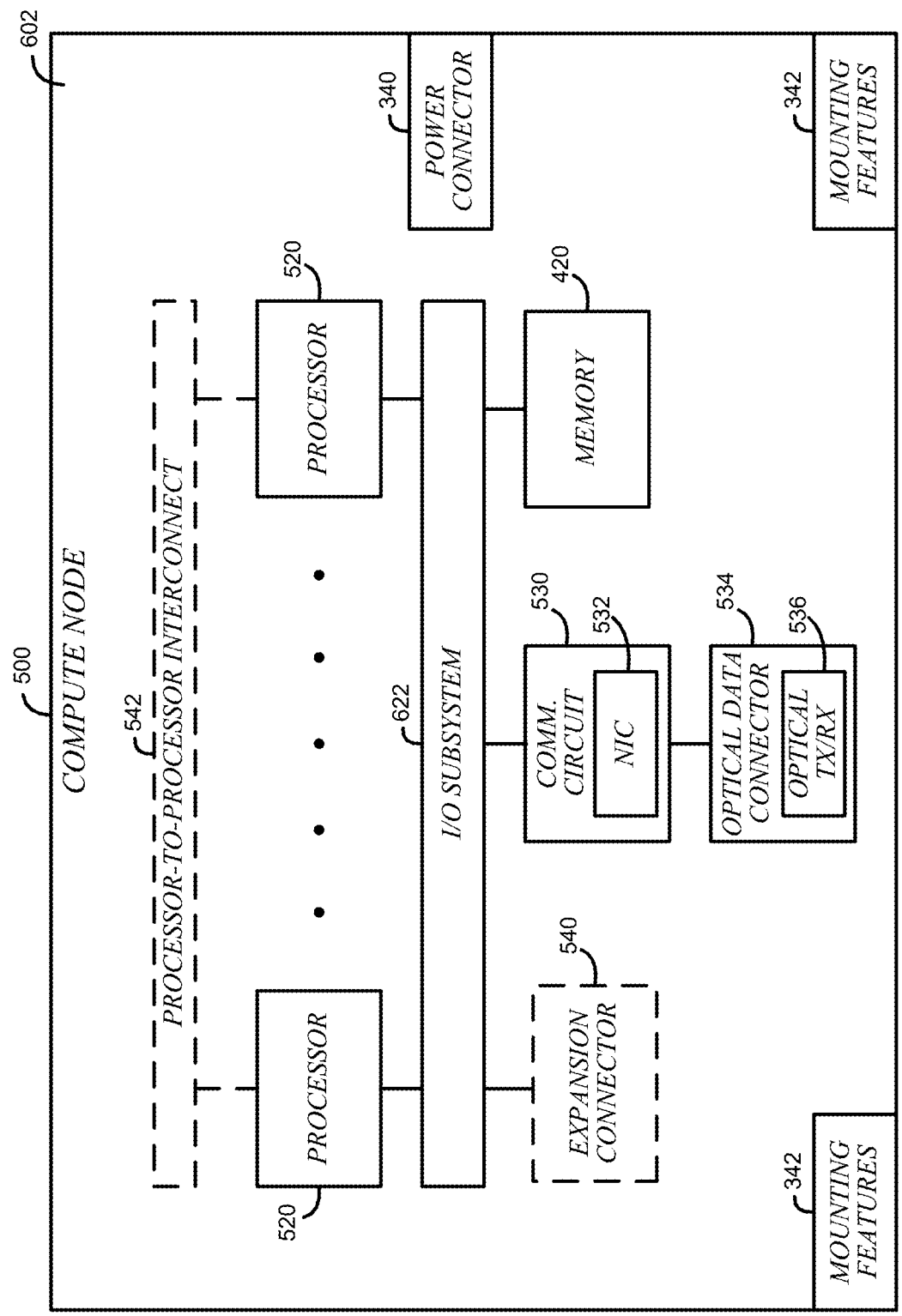
FIG. 5 is a simplified block diagram of at least one embodiment of a compute node.

Referring now to FIG. 5, in some embodiments, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks.

In the illustrative compute node 500, the physical resources 320 are embodied as processors 520. Although only two processors 520 are shown in FIG. 5, it should be appreciated that the compute node 500 may include additional processors 520 in other embodiments. Illustratively, the processors 520 are embodied as high-performance processors 520 and may be configured to operate at a relatively high power rating.

In some embodiments, the compute node 500 may also include a processor-to-processor interconnect 542. Processor-to-processor interconnect 542 may be embodied as any type of communication interconnect capable of facilitating processor-to-processor interconnect 542 communications. In the illustrative embodiment, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an UltraPath Interconnect (UPI), or other high-speed point-to-point interconnect dedicated to processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. In such embodiments, the local processor of the NIC 532 may be capable of performing one or more of the functions of the processors 520. Additionally or alternatively, in such embodiments, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative embodiment, the optical transceiver 536 may form a portion of the communication circuit 530 or even processor 520 in other embodiments.

In some embodiments, the compute node 500 may also include an expansion connector 540. In such embodiments, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 6:
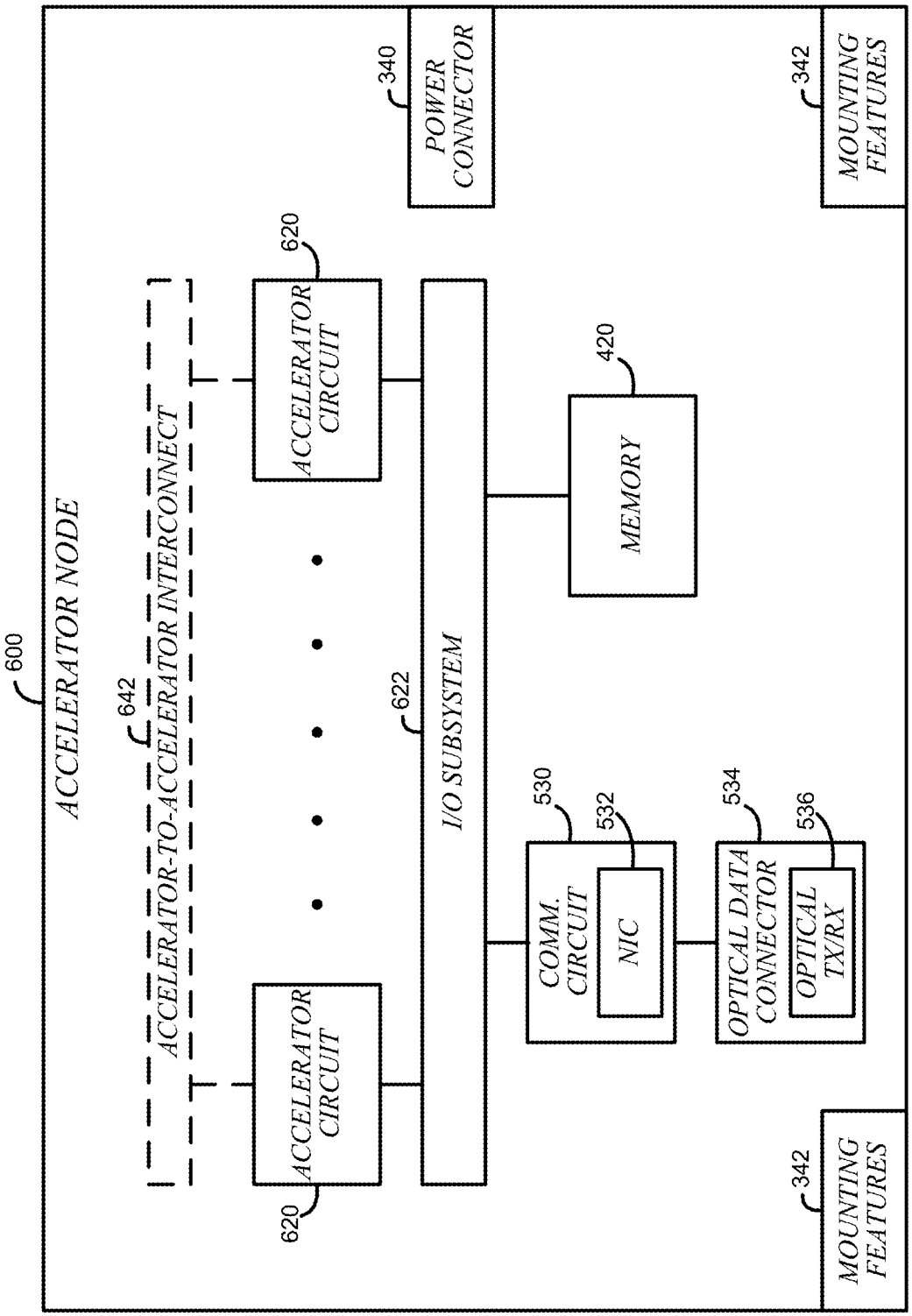
FIG. 6 is a simplified block diagram of at least one embodiment of an accelerator node usable in a data center.

Referring now to FIG. 6, in some embodiments, the node 400 may be embodied as an accelerator node 600. The accelerator node 600 is configured to perform specialized compute tasks, such as machine learning, encryption, hashing, or other computational-intensive task. In some embodiments, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other embodiments. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative embodiment, the accelerator-to-accelerator interconnect 642 is embodied as a high-speed point-to-point interconnect (e.g., faster than the I/O subsystem 622). For example, the accelerator-to-accelerator interconnect 642 may be embodied as a QuickPath Interconnect (QPI), an UltraPath Interconnect (UPI), or other high-speed point-to-point interconnect dedicated to processor-to-processor communications. In some embodiments, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
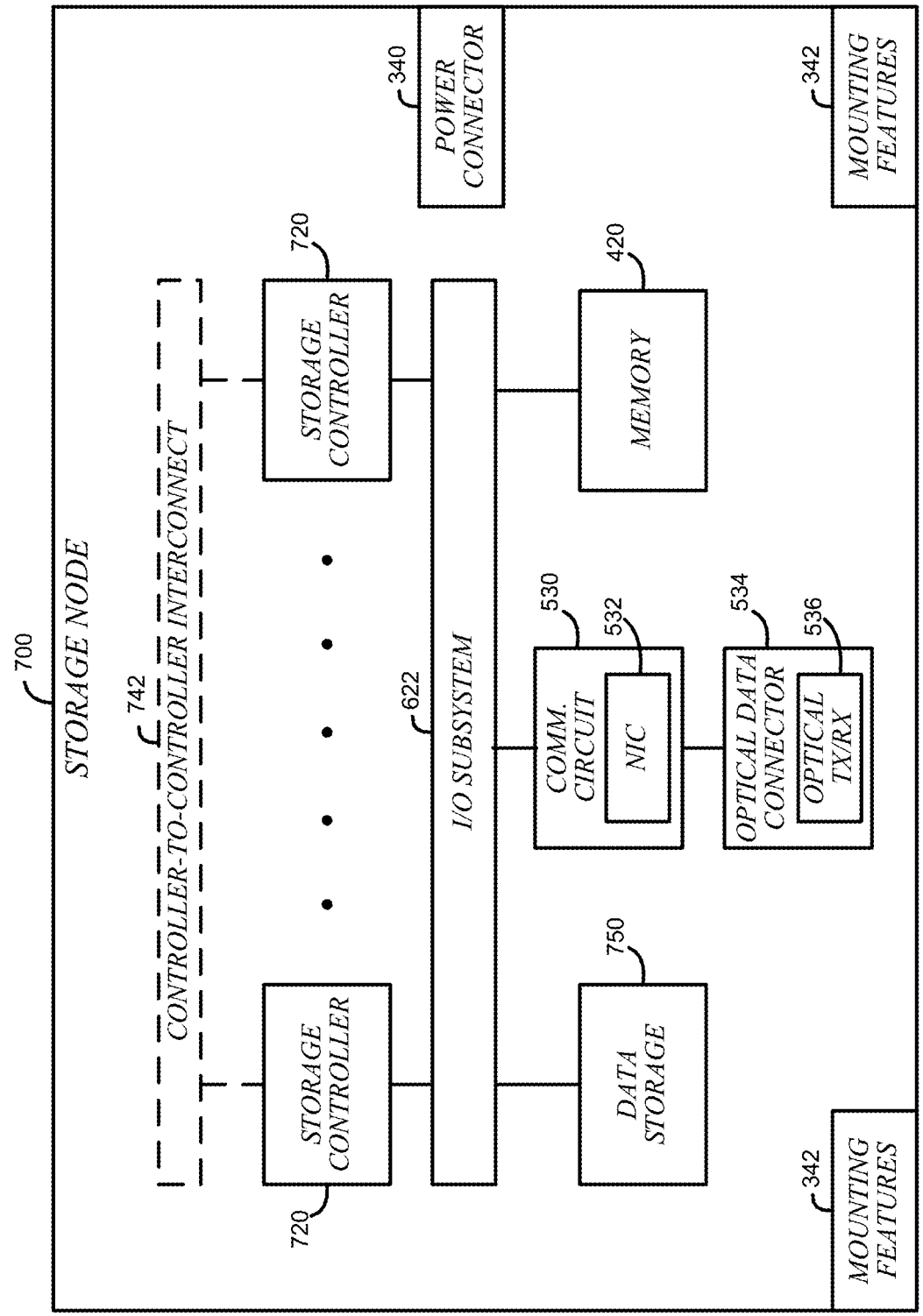
FIG. 7 is a simplified block diagram of at least one embodiment of a storage node usable in a data center.

Referring now to FIG. 7, in some embodiments, the node 400 may be embodied as a storage node 700. The storage node 700 is configured to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other embodiments. The storage controllers 720 may be embodied as any type of processor, controller, or control circuit capable of controlling the storage and retrieval of data into the data storage 750 based on requests received via the communication circuit 530. In the illustrative embodiment, the storage controllers 720 are embodied as relatively low-power processors or controllers. For example, in some embodiments, the storage controllers 720 may be configured to operate at a power rating of about 75 watts.

In some embodiments, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative embodiment, the controller-to-controller interconnect 742 is embodied as a high-speed point-to-point interconnect (e.g., faster than the I/O subsystem 622). For example, the controller-to-controller interconnect 742 may be embodied as a QuickPath Interconnect (QPI), an UltraPath Interconnect (UPI), or other high-speed point-to-point interconnect dedicated to processor-to-processor communications.

Figure 8:
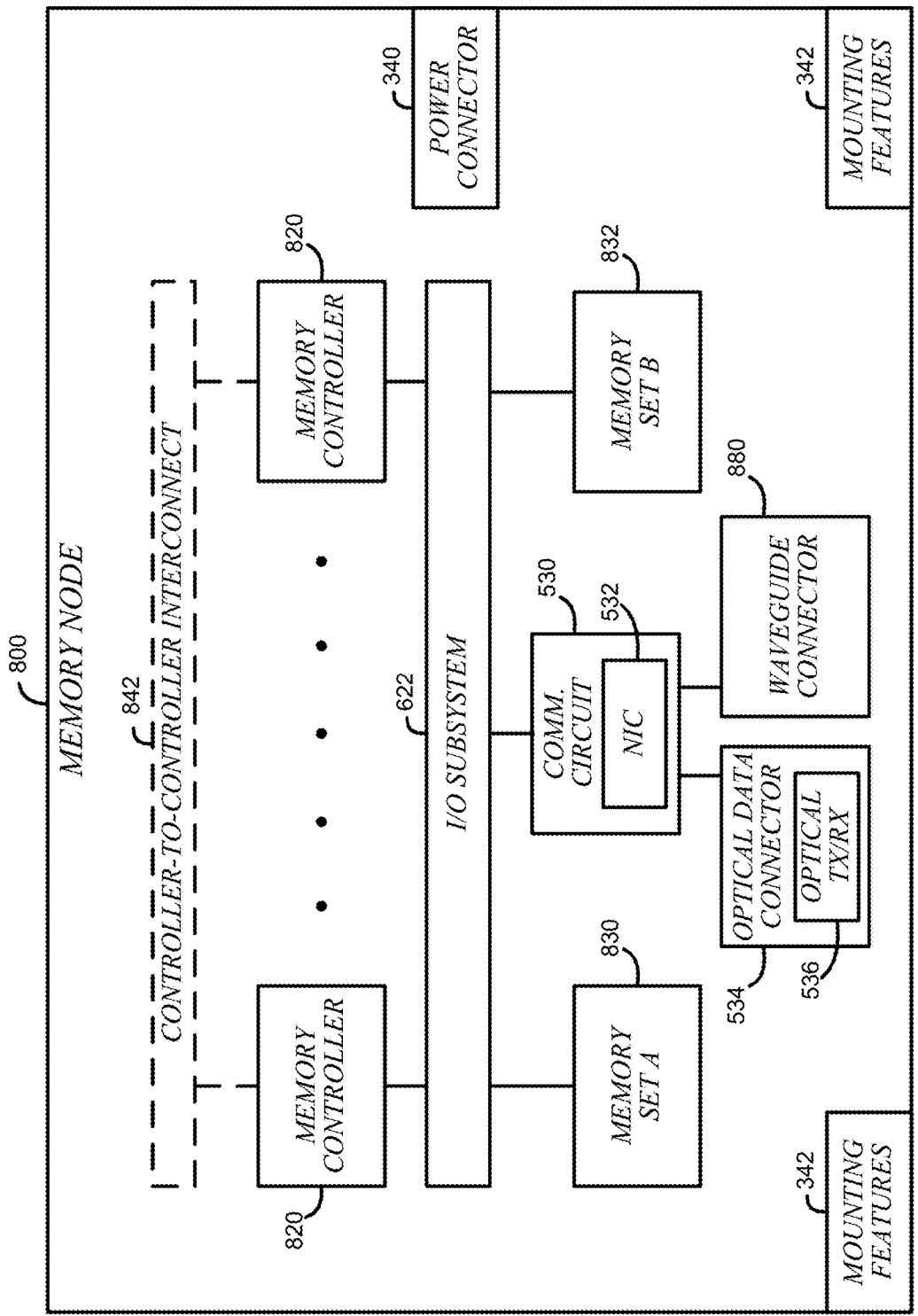
FIG. 8 is a simplified block diagram of at least one embodiment of a memory node usable in a data center.

Referring now to FIG. 8, in some embodiments, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other embodiments. The memory controllers 820 may be embodied as any type of processor, controller, or control circuit capable of controlling the writing and reading of data into the memory sets 830, 832 based on requests received via the communication circuit 530. In the illustrative embodiment, each memory controller 820 is connected to a corresponding memory set 830, 832 to write to and read from memory devices 420 within the corresponding memory set 830, 832 and enforce any permissions (e.g., read, write, etc.) associated with node 400 that has sent a request to the memory node 800 to perform a memory access operation (e.g., read or write).

In some embodiments, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative embodiment, the controller-to-controller interconnect 842 is embodied as a high-speed point-to-point interconnect (e.g., faster than the I/O subsystem 622). For example, the controller-to-controller interconnect 842 may be embodied as a QuickPath Interconnect (QPI), an UltraPath Interconnect (UPI), or other high-speed point-to-point interconnect dedicated to processor-to-processor communications. As such, in some embodiments, a memory controller 820 may access, through the controller-to-controller interconnect 842, memory that is within the memory set 832 associated with another memory controller 820. In some embodiments, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency associated with performing memory access operations as compared to accessing contiguous memory addresses from the same memory device.

Further, in some embodiments, the memory node 800 may be connected to one or more other nodes 400 (e.g., in the same rack 240 or an adjacent rack 240) through a waveguide, using the waveguide connector 880. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
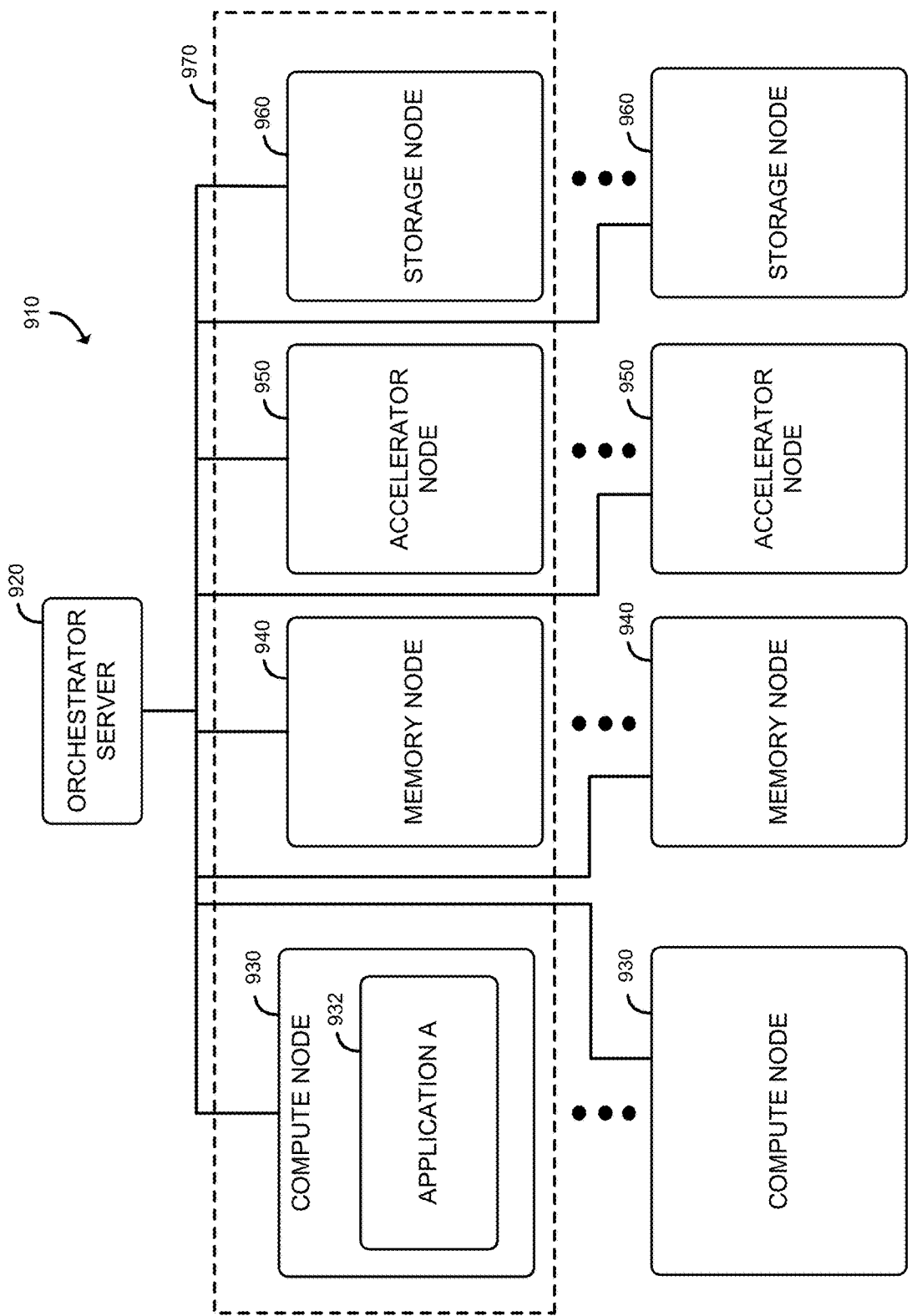
FIG. 9 depicts a system for executing one or more workloads.

Referring now to FIG. 9, a system for executing one or more workloads (e.g., applications) may be implemented. In the illustrative embodiment, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., each similar to the compute node 500), memory nodes 940 (e.g., each similar to the memory node 800), accelerator nodes 950 (e.g., each similar to the accelerator node 600), and storage nodes 960 (e.g., each similar to the storage node 700). One or more of the nodes 930, 940, 950, 960 may be grouped into a managed node 970, such as by the orchestrator server 920, to collectively perform a workload (e.g., an application 932 executed in a virtual machine or in a container).

The managed node 970 may be embodied as an assembly of physical resources 320, such as processors 520, memory resources 420, accelerator circuits 620, or data storage 750, from the same or different nodes 400. Physical resources 320 from the same compute node 500 or the same memory node 800 or the same accelerator node 600 or the same storage node 700 can be assigned to a single managed node 970. Alternatively, physical resources 320 from the same node 400 can be assigned to different managed nodes 970. Further, the managed node may be established, defined, or "spun up" by the orchestrator server 920 at the time a workload is to be assigned to the managed node or at any other time, and may exist regardless of whether any workloads are presently assigned to the managed node. In the illustrative embodiment, the orchestrator server 920 may selectively allocate and/or deallocate physical resources 320 from the nodes 400 and/or add or remove one or more nodes 400 from the managed node 970 as a function of quality of service (QoS) targets (e.g., a target throughput, a target latency, a target number instructions per second, etc.) associated with a service level agreement for the workload (e.g., the application 932). In doing so, the orchestrator server 920 may receive telemetry data indicative of performance conditions (e.g., throughput, latency, instructions per second, etc.) in each node 400 of the managed node 970 and compare the telemetry data to the quality of service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some embodiments, the orchestrator server 920 may identify trends in the resource utilization of the workload (e.g., the application 932), such as by identifying phases of execution (e.g., time periods in which different operations, each having different resource utilizations characteristics, are performed) of the workload (e.g., the application 932) and pre-emptively identifying available resources in the data center and allocating them to the managed node 970 (e.g., within a predefined time period of the associated phase beginning). In some embodiments, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with each potential resource available in the data center 100 (e.g., the latency associated with the performance of the resource itself in addition to the latency associated with the path through the network between the compute node executing the workload and the node 400 on which the resource is located).

In some embodiments, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some embodiments, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 920 may identify patterns in resource utilization phases of the workloads and use the patterns to predict future resource utilization of the workloads.

To reduce the computational load on the orchestrator server 920 and the data transfer load on the network, in some embodiments, the orchestrator server 920 may send self-test information to the nodes 400 to enable each node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Each node 400 may then report back a simplified result (e.g., yes or no) to the orchestrator server 920, which the orchestrator server 920 may utilize in determining the allocation of resources to managed nodes.

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

In the following description, methods, configurations, and related apparatuses are disclosed for various improvements to the configuration and functional capabilities of an edge computing architecture and an implementing edge computing system. These improvements may benefit a variety of use cases, especially those involving multiple stakeholders of the edge computing system—whether in the form of multiple users of a system, multiple tenants on a system, multiple devices or user equipment interacting with a system, multiple services being offered from a system, multiple resources being available or managed within a system, multiple forms of network access being exposed for a system, multiple locations of operation for a system, and the like. Such multi-dimensional aspects and considerations are generally referred to herein as "multi-entity" constraints, with specific discussion of resources managed or orchestrated in multi-tenant and multi-service edge computing configurations.

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local service-level agreements (SLAs), manage tiered service requirements, and enable local features and functions on a temporary or permanent basis.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud in a multi-tenant, multi-owner, or multi-access setting, where services and applications are requested by many users, especially as network usage dynamically fluctuates and the composition of the multiple stakeholders, use cases, and services changes.

Figure 10:
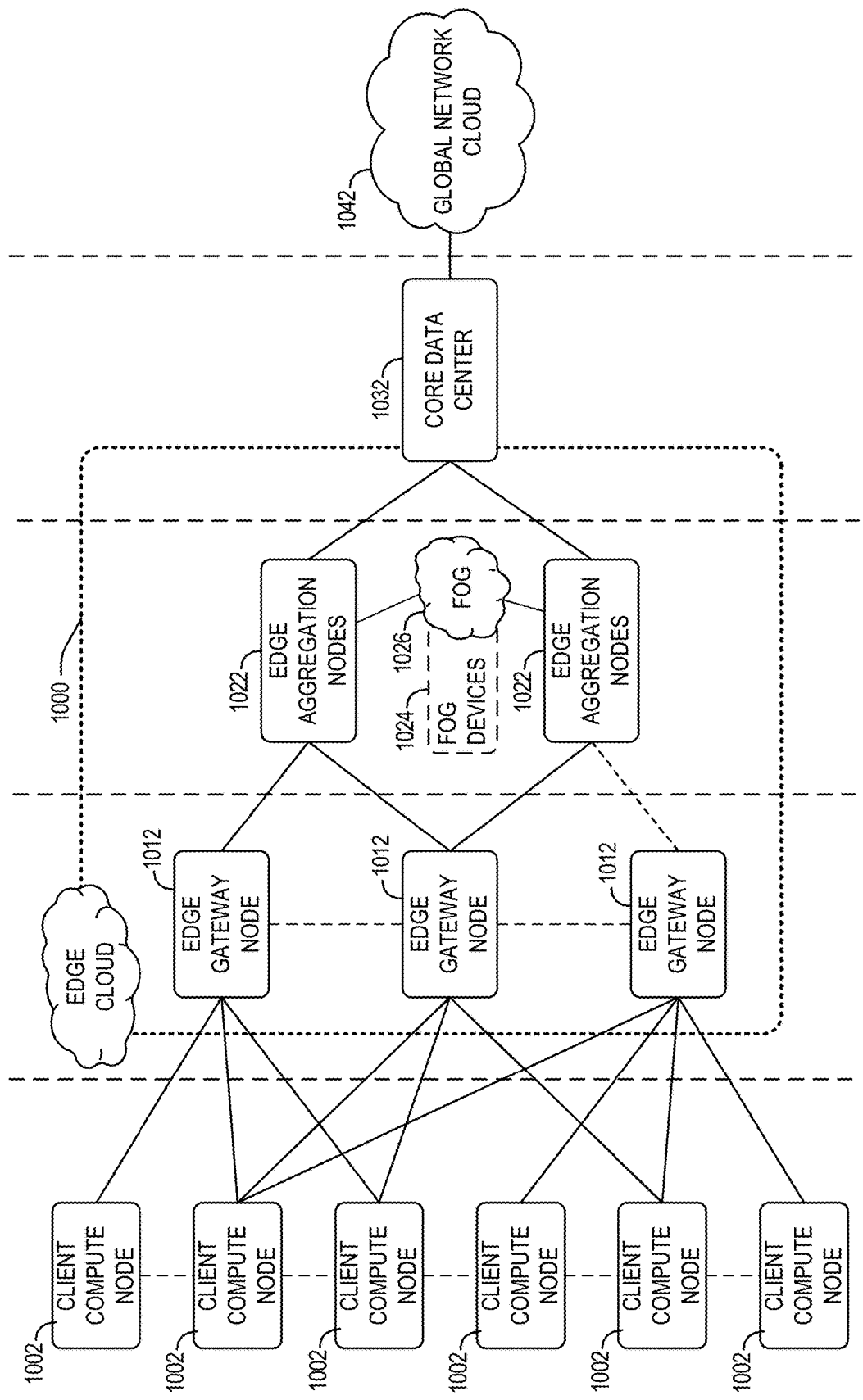
FIG. 10 depicts an example system.

FIG. 10 generically depicts an edge computing system 1000 for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. The implementation of the edge computing system 1000 may be provided at or on behalf of a telecommunication service provider ("telco", or "TSP"), internet-of-things service provider, cloud service provider (CSP), enterprise entity, or any other number of entities. Various implementations and configurations of the system 1000 may be provided dynamically, such as when orchestrated to meet service objectives.

For example, the client compute nodes 1002 are located at an endpoint layer, while the edge gateway nodes 1012 are located at an edge devices layer (local level) of the edge computing system 1000. Additionally, the edge aggregation nodes 1022 (and/or fog devices 1024, if arranged or operated with or among a fog networking configuration 1026) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provide a decentralized architecture and serves as an extension to cloud computing by collaborating with one or more edge node devices, providing the subsequent amount of localized control, configuration and management, and much more for end devices. Furthermore, Fog computing provides the ability for edge resources to identify similar resources and collaborate in order to create an edge-local cloud which can be used solely or in conjunction with cloud computing in order to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1032 is located at a core network layer (a regional or geographically-central level), while the global network cloud 1042 is located at a cloud data center layer (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 1032 may be located within, at, or near the edge cloud 1000. Although an illustrative number of client compute nodes 1002, edge gateway nodes 1012, edge aggregation nodes 1022, edge core data centers 1032, global network clouds 1042 are shown in FIG. 10, it should be appreciated that the edge computing system 1000 may include additional devices or systems at each layer. Devices at any layer can be configured as peer nodes to each other and, accordingly, act in a collaborative manner to meet service objectives.

Consistent with the examples provided herein, a client compute node 1002 may be embodied as any type of endpoint component, device, appliance, or other thing capable of communicating as a producer or consumer of data. Further, the label "node" or "device" as used in the edge computing system 1000 does not necessarily mean that such node or device operates in a client or agent/minion/follower role; rather, any of the nodes or devices in the edge computing system 1000 refer to individual entities, nodes, or subsystems which include discrete or connected hardware or software configurations to facilitate or use the edge cloud 1000.

As such, the edge cloud 1000 is formed from network components and functional features operated by and within the edge gateway nodes 1012 and the edge aggregation nodes 1022. The edge cloud 1000 may be embodied as any type of network that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge cloud 1000 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1000 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud 1000 between the core data center 1032 and the client endpoints (e.g., client compute nodes 1002). Some of these are discussed in the following sections in the context of network functions or service virtualization, including the use of virtual edges and virtual services which are orchestrated for multiple stakeholders.

As discussed in more detail below, the edge gateway nodes 1012 and the edge aggregation nodes 1022 cooperate to provide various edge services and security to the client compute nodes 1002. Furthermore, because a client compute node 1002 may be stationary or mobile, a respective edge gateway node 1012 may cooperate with other edge gateway devices to propagate presently provided edge services, relevant service data, and security as the corresponding client compute node 1002 moves about a region. To do so, the edge gateway nodes 1012 and/or edge aggregation nodes 1022 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 1000. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 1000, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

The deployment of a multi-stakeholder edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge computing nodes as a supplemental tool to cloud computing. In a contrasting system example applicable to a telecommunications service provider (TSP), the deployment of an edge computing system may be provided via a "network-aggregation" approach, to introduce edge computing nodes at locations in which network accesses (from different types of data access networks) are aggregated. FIGS. 5 and 6 contrast these over-the-top and network-aggregation approaches for networking and services in respective edge computing system. However, these over-the-top and network aggregation approaches may be implemented together in a hybrid or merged approach or configuration as suggested in later examples.

Figure 11:
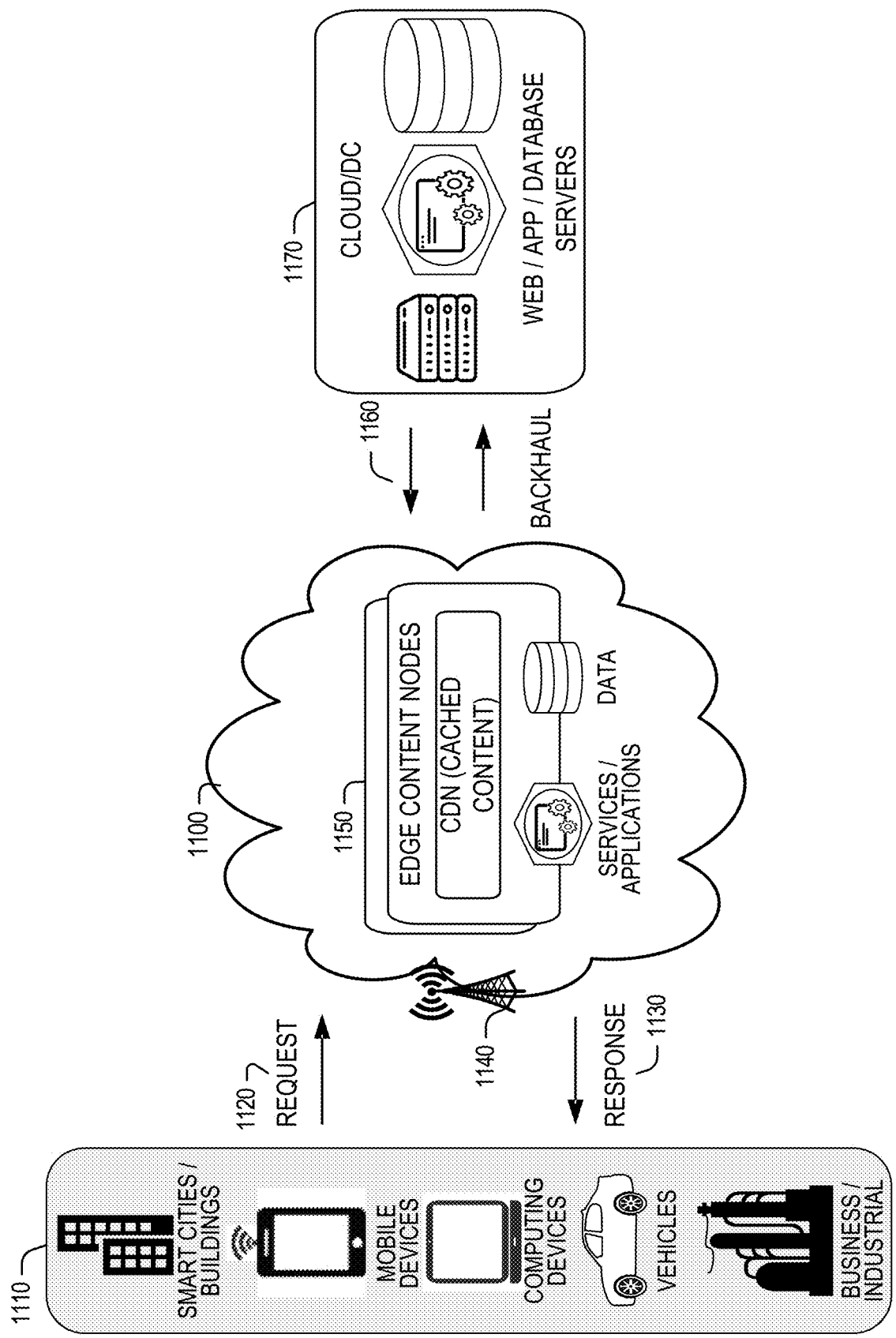
FIG. 11 shows an example system.

FIG. 11 shows an example where various client endpoints 1110 (in the form of mobile devices, computers, autonomous vehicles, business computing equipment, industrial processing equipment) provide requests 1120 for services or data transactions, and receive responses 1130 for the services or data transactions, to and from the edge cloud 1100 (e.g., via a wireless or wired network 1140). Within the edge cloud 1000, the CSP may deploy various compute and storage resources, such as edge content nodes 1150 to provide cached content from a distributed content delivery network. Other available compute and storage resources available on the edge content nodes 1150 may be used to execute other services and fulfill other workloads. The edge content nodes 1150 and other systems of the edge cloud 1000 are connected to a cloud or data center 1170, which uses a backhaul network 1160 to fulfill higher-latency requests from a cloud/data center for websites, applications, database servers, etc.

Figure 12:
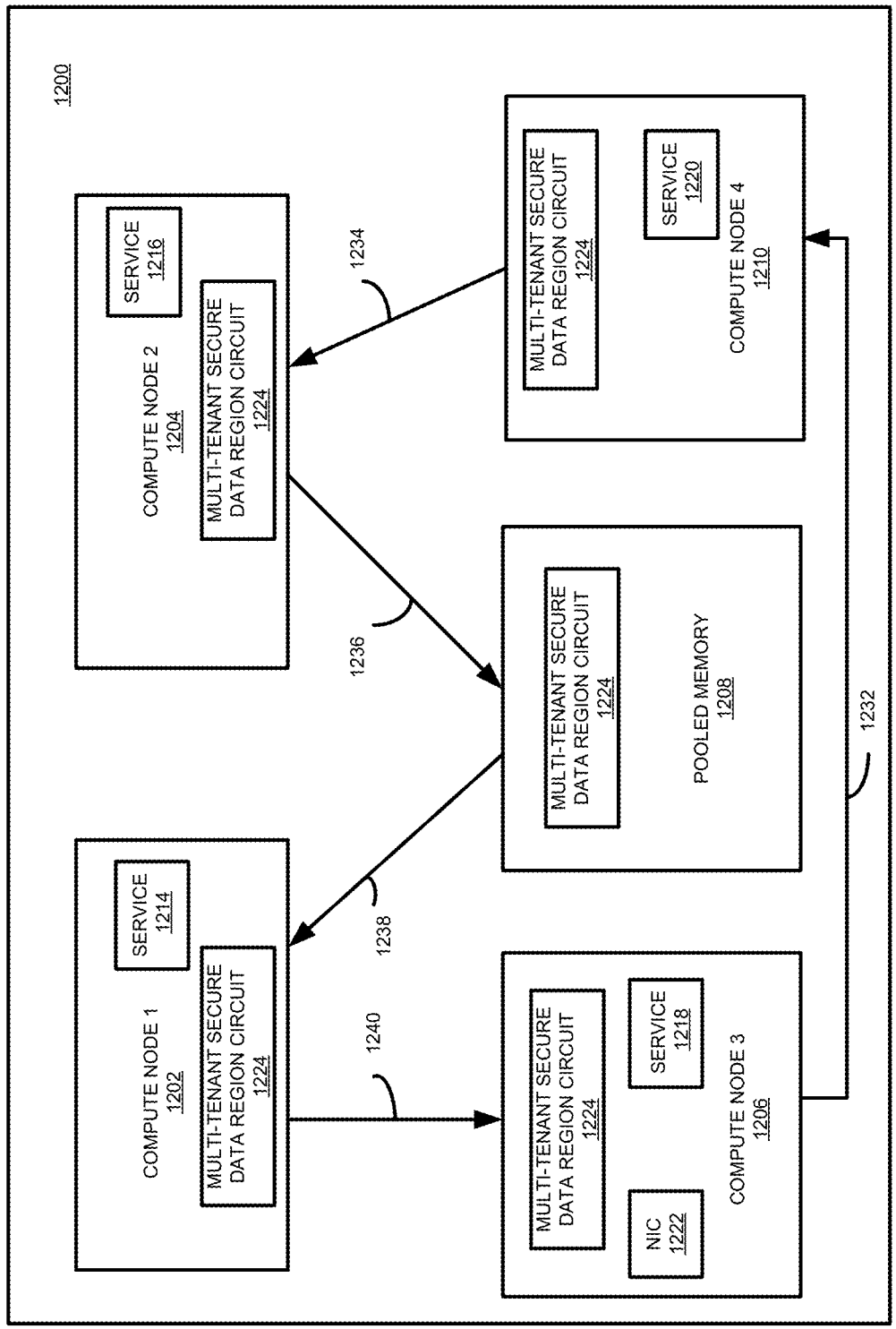
FIG. 12 is a block diagram of an embodiment of the system described in conjunction with FIG. 9.

FIG. 12 is a block diagram of an embodiment of the system 910 described in conjunction with FIG. 9. System 1200 in FIG. 12 includes a plurality of communicatively coupled nodes that include four compute nodes (compute node 1 1202, compute node 2 1204, compute node 3 1206 and compute node 4 1210) and pooled memory 1208.

Dynamic secure multi-tenant data regions are created within the system 1200 to increase service density while providing required levels of service-level agreement (SLA) and Quality of Service (QoS) (for example, jitter, latency and bandwidth) and providing a secure envelope to the services so they and their data is protected (either when is used or stored or is traversing between different nodes) in the system.

Each node in system 1200 has a multi-tenant secure data region circuit 1224 to allow services for applications owned by different tenants to share an encryption key that is used when data is transferred between services in applications executing in different nodes via a multi-tenant isolated secure data region in the system 1200. The multi-tenant secure data region can also be referred to as a data lake. A service can be composed of multiple processes, or can be a single process.

A tenant can be a single company or supplier or user creating/deploying/using multiple services working together for full workload view. A tenant can also be multiple trusted services potentially provided by different companies working together in a workload that can be considered a super-tenant. A multi-tenant environment includes multiple such trust domains or super-tenants. Each data region multi-tenant circuit 1224 is a single tenant in a single system 1200 also referred to as a plane of a plurality of planes. At the physical level, the same physical pooled memory could be used for multiple tenants with different security settings for each one of them. At the same time, some resources (including pooled memory) can be used across tenants (trusted domains), meaning that while most tenant information is not accessible to other tenants (they do not trust each other), some could be, and it can be used, for example, for communication between tenants.

The multi-tenant isolated secure data region can be specified in terms of address ranges (for example, service 1220 process S3 maps range [A,B] inside compute node 4 1210 to a data region D1)

Data arrives to the system and traverses through multiple nodes/services that are hosted in different parts of the system 1200 and that are owned by different tenants. For example, a request for services in compute node 1204 that is received from a requestor in another system via Network Interface Controller (NIC) 1222 in compute node 3 1206 can be forwarded over communications link 1232 to compute node 4 1210 to be processed by a service 1220 in compute node 4 1210. The service 1220 can send a request over communications link 1234 to compute node 1204 for a service 1216. The service 1216 can forward data from the service 1216 over communications link 1236 to be stored in pooled memory 1208. A service 1214 in compute node 1202 can receive the data stored in pooled memory 1208 over communications link 1238, perform the service and forward the response to the received request over communications link 1240 to the NIC 1222 in compute node 3 1204 to be returned to the requester.

In an embodiment, the communications link is based on the CXL standard. The CXL standard includes three protocols, CXL.io, CXL.cache and CXL.memory. The compute nodes 1202, 1204, 1206, 1210 can use CXL memory or can be coherent (CXL.cache). The CXL.memory protocol allows compute nodes to directly access memory attached to other CXL devices in a cache-coherent manner. The CXL.cache protocol allows a connected device to cache data.

The dynamic secure multi-tenant data regions can be persistent or non-persistent. In the embodiment shown in FIG. 12, the dynamic secure multi-tenant data regions are within the system 1200 ("platform data regions). In other embodiments, the dynamic secure multi-tenant data regions can be system data regions or over fabric data regions.

In another embodiment secure data regions can be utilized within the memory in the system 1200 by expanding the functionality to the memory controllers of the compute nodes 1202, 1204, 1206, 1210 of system 1200. Each compute node 1202, 1204, 1206, 1210 and pooled memory 1208 has a memory controller.

There is, however, one important aspect here relevant for always encrypted memory, such as one within MKTME concept. In a system that uses always encrypted memory (for example, MKTME), next to (or integrated into) the memory controller there is Memory Encryption Engine (MEE). With MEE, everything within the memory until MEE is protected, but between MEE and compute it is not (assumed to be part of a protected enclave). The network between pooled memory 1208 and the compute nodes 1202, 1204, 1206, 1210 is not part of the protected enclave, so data has to be encrypted (tenant-specific) between pooled memory 1208 and compute nodes 1202, 1204, 1206, 1210.

Figure 13:
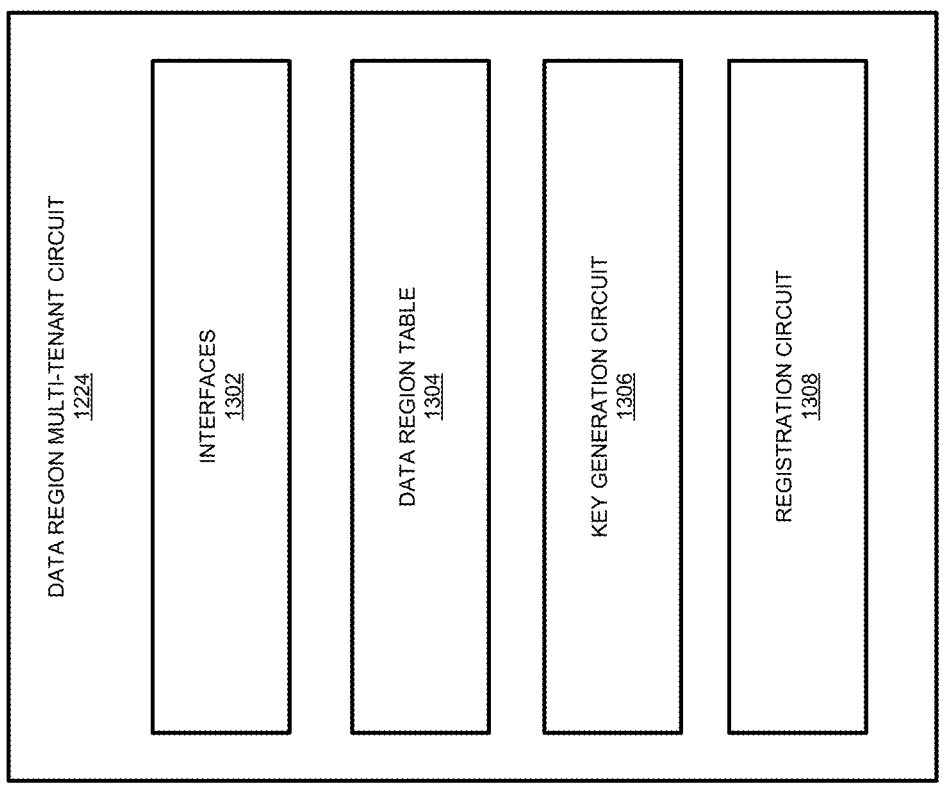
FIG. 13 is a block diagram illustrating elements in the multi-tenant secure data region circuit included in compute nodes and pooled memory of the system described in conjunction with FIG. 12.

FIG. 13 is a block diagram illustrating elements in the multi-tenant secure data region circuit 1224 included in compute nodes and pooled memory of the system 1200 described in conjunction with FIG. 12.

The Multi-tenant secure data region circuit 1224 includes interfaces 1302, a data region table 1304, a key generation circuit 1306 and a registration circuit 1308.

The interfaces 1302 create, modify and delete a secure data region to be used by the nodes in the system 1200. The interfaces 1302 that can be accessed via a hardware queue manager (a hardware managed system of queues used to link producers and consumers to obtain high throughput rates) include a command to create a data region for a set of PASIDs running in a set of nodes in system 1200 or update a data region with a particular Identifier (ID) with a new process or bit-stream running in a set of nodes in system 1200.

The data region table 1304 can be stored in a memory, for example, a Read Only Memory or a Content Addressable Memory (CAM).

Figure 14:
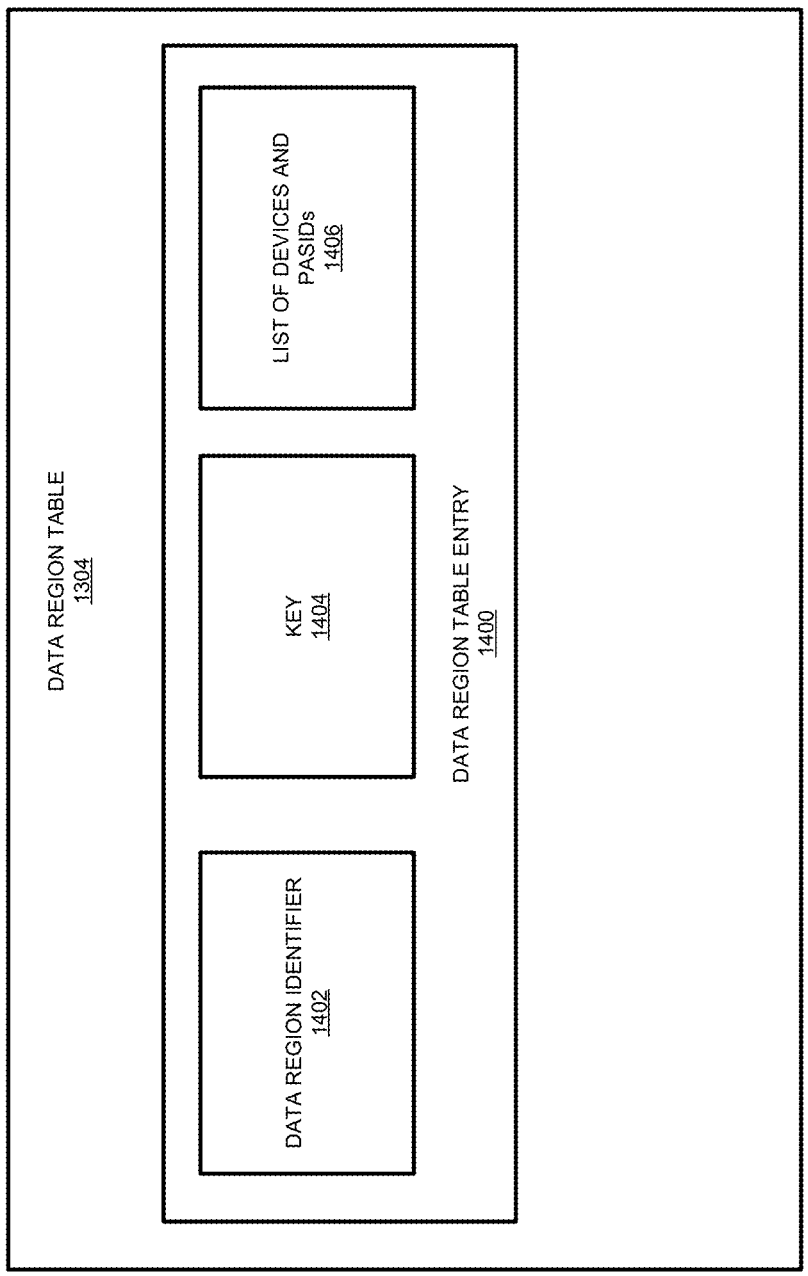
FIG. 14 illustrates an embodiment of a data region table entry in the data region table.

FIG. 14 illustrates an embodiment of a data region table entry 1400 in the data region table 1304. The data region identifier 1402 stores a Universally Unique Identifier (UUID) for the data region 1402, private key 1404 and list of devices and Process Address Space Identifiers (PASIDs) 1406.

The UUID stored in data region identifier 1402 is created by the system 1200 and is used to update (for example, to change an attribute or characteristics of the data region, for example, to modify the data or modify access permissions) and to delete the data region. The private key 1404 created by the system 1200 is used to create the data region. The private key 1404 is never exposed to a software stack or accessible to the software stack in system 1200. The List of devices with the corresponding process address ID 1406 includes the process(es) running on the node that use the secure data region. The list can also include other types of IDs, for example, if the node is an FPGA and the compute element is a bit-stream, other types of IDs can be used. The list can include a field to identify the type of memory in the compute node, for example, High Bandwidth Memory (HBM) or Static Dynamic Random Access Memory (SDRAM) in a Graphics Processing Unit (GPU).

In an embodiment, a data region table entry 1400 can include a memory type field identifying the type of memory in pooled memory 1208. For example, the type of memory can be persistent memory or volatile memory. If the type of memory is persistent memory, the persistent memory can be registered by the software stack.

Returning to FIG. 13, the key generation circuit 1306 generates a secure symmetric key to be utilized by the multi-tenant secure data region circuit 1224. The key generation circuit 1306 can use different encryption algorithms to generate the symmetric key. Examples of encryption algorithms that can be used include Rivest-Shamir-Adleman (RSA), Advanced Encryption Standard (AES)-128, AES-192, AES-256 or Blowfish (a symmetric-key block cipher). For example, the encryption algorithm can be selected to support different key requirements for nodes and memory controllers in a data region. In an embodiment, the key generation circuit 1306 discovers the characteristics of the nodes and memory controllers using the data region and selects the encryption algorithm based on the discovered characteristics. In other embodiments, the characteristics of the nodes and memory controllers (for example, memory latencies, memory bandwidths) are stored in a set of registers or Mode Select Registers in nodes in the system that can be accessed by the key generation circuit 1306 to select the encryption algorithm to be used to create the symmetric key to be used for the data region. The memory bandwidth can be based on a distance matrix showing more or less bandwidth.

The registration circuit 1308 obtains the secure symmetric key generated by the key generation circuit 1306 and propagates the secure symmetric key to the list of devices and PSAIDs 1406 in the data region table entry 1400 assigned to the key in the data region table 1304.

Figure 15:
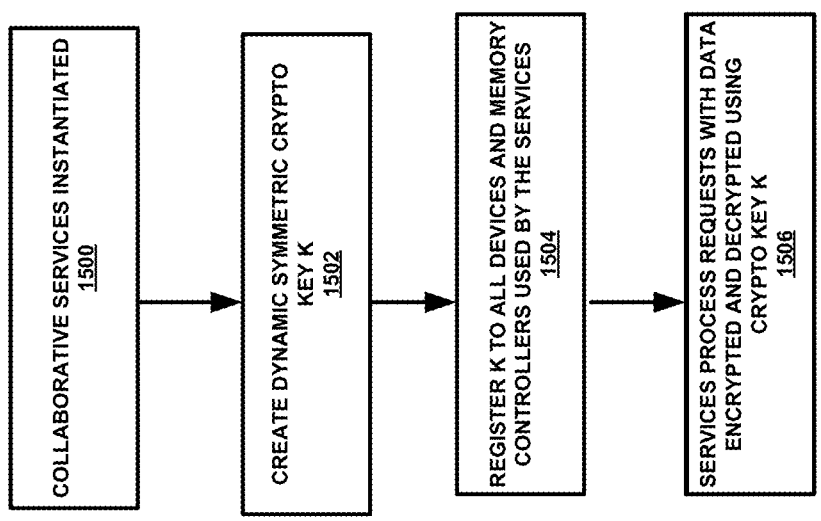
FIG. 15 is a flowgraph illustrating the use of the secure data region in the system shown in FIG. 12.

FIG. 15 is a flowgraph illustrating the use of the secure data region in the system 1200 shown in FIG. 12.

At block 1500, collaborative services are initialized.

At block 1502, the system creates a dynamic symmetric cryptographic key for the secure data region.

At block 1504, the dynamic symmetric cryptographic key is registered to the compute nodes using the secure data region.

At block 1506, services assigned to the secure data region start processing requests. Data used by the services is encrypted and decrypted using the dynamic symmetric cryptographic key for the secure data region.

FIG. 16 is a flowgraph illustrating the use of the secure data region in the system 1200 shown in FIG. 12 to process a received request by a set of different services owned by different tenants.

For example, an artificial intelligence (AI) natural language processing application (also referred to as a task) can use different services owned by different tenants in system 1200. The different services and tenants work collectively and share the data being processed. A first tenant performs pre-processing and signal processing. A second tenant performs speech to text and Natural Language Processing (NLP). FIG. 16 will be described in conjunction with the system 1200 shown in FIG. 12.

At block 1600, speech data to be processed by the AI natural language processing application is received by the NIC 1222 in compute node 3 1206. The received speech data is encrypted. As the private key used to encrypt the received speech data is shared by the compute nodes 1202, 1204, 1206 and 1210 and pooled memory 1208 the private key is not sent (forwarded) over the communications links 1232, 1234, 1236, 1238 and 1240 as the shared data is sent between the compute nodes 1202, 1204, 1206 and 1210 and pooled memory 1208. Service 1218 forwards the speech data over communications link 1342 to service 1220 in compute node 4 1210. Processing continues with block 1602.

At block 1602, service 1220 owned by the first tenant performs pre-processing of the received speech data and forwards the pre-processed speech data over communications link 1234 to service 1216. Processing continues with block 1604.

At block 1604, service 1216 performs signal processing on the received pre-processed speech data and forwards the processed speech data over communications link 1236 to be stored in pooled memory 1208. Processing continues with block 1606.

At block 1606, service 1214 in compute node 1 1202 reads the data from the pooled memory 1208 over communications link 1238, converts the processed speech data to text and forwards the text over communications link 1240 to service 1218 in compute node 1204. Processing continues with block 1608.

At block 1608, service 1218 in compute node 3 1204 performs natural language processing on the received text to provide a response (output of the natural language processing application) and the NIC 1222 returns the response. For example, if the natural language processing task is categorizing the type of email, the response can be spam, primary or promotion. In another example if the natural language processing application is a voice controlled application, the response can be the answer to a question.

It is envisioned that aspects of the embodiments herein can be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities can typically employ large data centers with a multitude of servers. Each blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board. These components can include the components discussed earlier in conjunction with FIG. 1.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A non-transitory machine readable storage medium (computer-readable store media) can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A compute node comprising:
    circuitry to:
        create a multi-tenant data region to be shared with other nodes; and
        propagate a key used to create the multi-tenant data region to each of the other nodes sharing the multi-tenant data region;
    wherein:
        the compute node and each of the other nodes sharing the multi-tenant data region are to store table data to associate the key with data region identifier data; and
        the data region identifier data is to be used in updating access permissions of the multi-tenant data region and/or deleting the multi-tenant data region.

2. The compute node of claim 1, wherein the multi-tenant data region is a dynamic secure multi-tenant data region.

3. The compute node of claim 1, wherein the key is shared by services running in nodes sharing the multi-tenant data region, to allow encrypted data stored in the multi-tenant data region to be transferred between nodes.

4. The compute node of claim 1, wherein the circuitry is to assign a Universally Unique Identifier (UUID) to the multi-tenant data region.

5. The compute node of claim 4, wherein the circuitry is to store a list of nodes that share the multi-tenant data region and a Process Address Space Identifier (PASID) assigned to each node.

6. The compute node of claim 1, wherein the key is a symmetric key.

7. The compute node of claim 1, wherein the multi-tenant data region is a platform data region.

8. One or more non-transitory, machine readable storage medium comprising a plurality of instructions stored thereon that, in response to being executed, cause a compute node to perform operations comprising:
    create a multi-tenant data region to be shared with other nodes; and
    propagate a key used to create the multi-tenant data region to each of the other nodes sharing the multi-tenant data region;
    wherein:
        the compute node and each of the other nodes sharing the multi-tenant data region are to store table data to associate the key with data region identifier data; and
        the data region identifier data is to be used in updating access permissions of the multi-tenant data region and/or deleting the multi-tenant data region.

9. The one or more non-transitory, machine readable storage medium of claim 8, wherein the multi-tenant data region is a dynamic secure multi-tenant data region, to allow encrypted data stored in the multi-tenant data region to be transferred between nodes.

10. The one or more non-transitory, machine readable storage medium of claim 8, wherein the key is shared by services running in nodes sharing the multi-tenant data region.

11. The one or more non-transitory, machine readable storage medium of claim 10, wherein the compute node is to:
    assign a Universally Unique Identifier (UUID) to the multi-tenant data region.

12. The one or more non-transitory, machine readable storage medium of claim 11, wherein the compute node is to: store a list of nodes that share the multi-tenant data region and a Process Address Space Identifier (PASID) assigned to each of the nodes.

13. A method comprising:
    creating, by a compute node, a multi-tenant data region to be shared with other nodes; and
    propagating, by the compute node, a key used to create the multi-tenant data region to each of the other nodes sharing the multi-tenant data region;
    wherein:
        the compute node and each of the other nodes sharing the multi-tenant data region are to store table data to associate the key with data region identifier data; and
        the data region identifier data is to be used in updating access permissions of the multi-tenant data region and/or deleting the multi-tenant data region.

14. The method of claim 13, wherein the multi-tenant data region is a dynamic secure multi-tenant data region.

15. The method of claim 13, wherein the key is shared by services running in nodes sharing the multi-tenant data region, to allow encrypted data stored in the multi-tenant data region to be transferred between nodes.

16. The method of claim 13, wherein the compute node is to assign a Universally Unique Identifier (UUID) to the multi-tenant data region.

17. The method of claim 16, wherein the compute node is to store a list of nodes that share the multi-tenant data region and a Process Address Space Identifier (PASID) assigned to each node.

18. A system comprising:
    a compute node comprising:
        circuitry to:
            create a multi-tenant data region to be shared with other nodes; and
            propagate a key used to create the multi-tenant data region to each of the other nodes sharing the multi-tenant data region; and
    a pooled memory communicatively coupled to the compute node, the compute node to propagate the key to the pooled memory;
    wherein:
        the compute node, each of the other nodes sharing the multi-tenant data region, and the pooled memory are to store table data to associate the key with data region identifier data; and
        the data region identifier data is to be used in updating access permissions of the multi-tenant data region and/or deleting the multi-tenant data region.

19. The system of claim 18, wherein the multi-tenant data region is a dynamic secure multi-tenant data region.

20. The system of claim 18, wherein the key is shared by services running in nodes sharing the multi-tenant data region, to allow encrypted data stored in the multi-tenant data region to be transferred between nodes.

21. The system of claim 18, wherein the circuitry is to assign a Universally Unique Identifier (UUID) to the multi-tenant data region.

22. The system of claim 21, wherein the circuitry is to store a list of nodes that share the multi-tenant data region and a Process Address Space Identifier (PASID) assigned to each node.

* * * * *